United States Patent
Ohara (10) Patent No.: US 7,294,843 B2
(45) Date of Patent: Nov. 13, 2007

(54) METHOD AND APPARATUS FOR DETERMINING AN OPTIMAL GAP DISTANCE BETWEEN AN OPTICAL FIBER AND AN OPTICAL DEVICE

(75) Inventor: Tetsuo Ohara, Sutton, MA (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 241 days.

(21) Appl. No.: 11/224,253

(22) Filed: Sep. 12, 2005

(65) Prior Publication Data
US 2007/0058912 A1  Mar. 15, 2007

(51) Int. Cl.
*G01B 21/16* (2006.01)
*G12B 21/08* (2006.01)

(52) U.S. Cl. .................. 250/491.1; 385/97; 385/90
(58) Field of Classification Search ........... 250/491.1; 385/90, 97
See application file for complete search history.

(56) References Cited

U.S. PATENT DOCUMENTS 5,254,854 A * 10/1993 Betzig .................. 250/234
5,559,358 A     9/1996 Burns et al.
5,982,009 A * 11/1999 Hong et al. ........... 257/414
7,236,680 B1 * 6/2007 Jordan .................. 385/147

\* cited by examiner

*Primary Examiner*—Jack I. Berman
(74) *Attorney, Agent, or Firm*—RatnerPrestia (57) ABSTRACT

An optical alignment system for optimizing a gap distance between an optical fiber end and an optical device uses an atomic force present when the gap distance approaches optimal alignment according to changes in an oscillating fiber amplitude at a fiber resonance frequency. A driving force flexurally vibrates the fiber to produce an oscillation of the fiber at a resonance frequency that produces maximal oscillation. A measurement system detects the amplitude shift at the resonance frequency while adjusting the gap distance.

18 Claims, 6 Drawing Sheets

METHOD AND APPARATUS FOR DETERMINING AN OPTIMAL GAP DISTANCE BETWEEN AN OPTICAL FIBER AND AN OPTICAL DEVICE

FIELD OF THE INVENTION

The present invention relates generally to fiber-coupled optical assemblies and, more particularly, to a method of precisely aligning an optical fiber to an optical device according to a flexural vibration of the optical fiber.

BACKGROUND OF THE INVENTION

The importance of achieving accurate mutual alignment of individual components in any optical system is well known. The miniature dimensions of components used in modern optical communication systems render such alignment difficult both to achieve and to maintain. For example, one problem in the construction of laser transmitters is that of efficiently coupling the optical output from a laser diode into an optical fiber. To obtain efficient coupling, the fiber end is desirably precisely aligned with the emitting area of the laser. When such an alignment is achieved, the fiber is then fixed in place, ideally by a method that ensures alignment is sustained throughout the device lifetime.

Typically, precise alignment of the fiber involves aligning the end of the fiber in at least one direction relative to the optical device to provide a maximum energy transfer from the optical device to the fiber. A further optical device such as a photodiode may be used to measure optical power coupled into the optical fiber. The fiber may be adjusted in vertical and lateral alignment until a maximum power coupling is achieved. A predetermined gap distance may be used for horizontal alignment or the gap distance may be adjusted while visually monitoring the distance to avoid direct contact between the fiber and the optical device.

It is typically difficult, however, to determine an optimal gap distance. Even if visual means are used, the resolution of cameras or other monitoring devices available may not be sufficient to allow accurate determination of an optimal coupling position. The resolution of the image may also make the position of the edge of the fiber and/or the optical device difficult to determine. This uncertainty may result in a premature contact between the fiber and the optical device or in the optical device being separated from the optical fiber by too large a gap.

SUMMARY OF THE INVENTION

The present invention is embodied in an optical fiber alignment system for aligning an end of an optical fiber with an optical device to provide a gap distance between the optical fiber and the optical device. The optical fiber alignment system includes a first actuator for applying a force having a component that is normal to a central axis along the length of the optical fiber. The force provides a flexural vibration of the optical fiber to cause an oscillation of the optical fiber and is provided at a resonance frequency of the optical fiber. The optical alignment system further includes a sensing apparatus for sensing the oscillation of the optical fiber and a detector for determining a shift in amplitude of the oscillation. The optical alignment system further includes a second actuator for adjusting the gap distance between the optical fiber and the optical device according to the shift in the amplitude of the oscillation determined by the detector. An atomic force between the end of the optical fiber and the optical device varies according to the gap distance provided by the second actuator, the variation in the atomic force causing the shift in the amplitude of the oscillation. Sometimes, the optimal gap distance would be on the order of μm. This new invention can tell the absolute relative distance between the laser facet and the fiber edge in μm precision. Once this distance is identified, the second actuator can move the fiber position back to the optimal position.

In an exemplary embodiment, the optimal gap distance may be on the order of microns. Embodiments of the present invention may determine an absolute relative distance between the laser facet and the fiber edge to nanometer precision. Once the absolute relative distance has been determined with nanometer precision in one fiber position, a second actuator may be used to move the fiber position back to the optimal position.

The present invention is further embodied in a method of aligning an end of an optical fiber to an optical device according to a gap distance between the end of the optical fiber and the optical device. The method aligns the end of the optical fiber to be substantially at a predetermined position relative to the optical device and applies a first driving force normal to a central axis along a length of the optical fiber to provide a flexural oscillation of the optical fiber at the resonance frequency of the optical fiber. The method further measures the flexural oscillation of the optical fiber, monitors a shift in amplitude of the flexural oscillation and adjusts the gap distance between the optical fiber and the optical device. The gap distance changes an atomic force between the optical fiber and the optical device which provides a shift in the amplitude of the flexural oscillation. The method further monitors the shift in amplitude and adjusts the gap distance until the amplitude of the flexural oscillation is reduced by at least a threshold amount.

BRIEF DESCRIPTION OF THE DRAWINGS

The invention is best understood from the following detailed description when read in connection with the accompanying drawing. It is emphasized that, according to common practice, the various features of the drawing are not to scale. On the contrary, the dimensions of the various features are arbitrarily expanded or reduced for clarity. Included in the drawing are the following figures.

DETAILED DESCRIPTION OF THE INVENTION

Figure 1A:
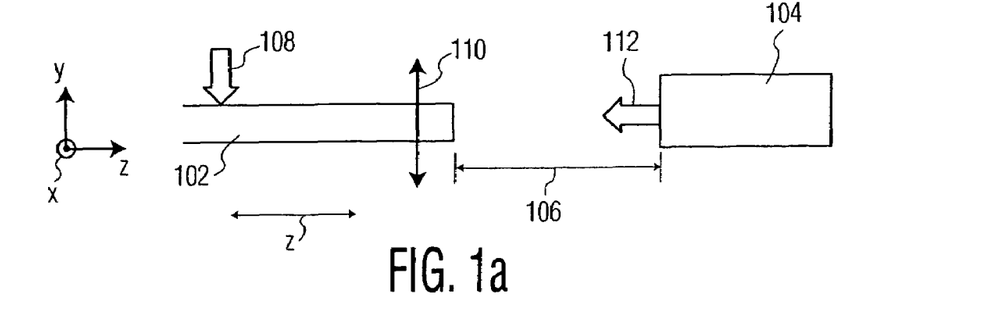
FIG. 1a is a side view illustrating a relationship between optical fiber oscillation and an atomic force provided by an optical device according to an exemplary method of the present invention.

Referring now to the drawing, in which like reference numbers refer to like elements throughout the various figures that comprise the drawing, FIG. 1a illustrates a relationship between an optical fiber oscillation 110 caused by a vibration and an atomic force 112 provided by an interaction between an optical device 104 and the tip of optical fiber 102 according to an exemplary method of determining an optimal gap distance. As gap distance 106 decreases, an interaction between oscillation 110 and atomic force 112 may change the vibration conditions, thus providing an indication of proximity to the optical device 104.

According to an exemplary method, a flexural driving force 108 may be provided to optical fiber 108 in a first direction. Flexural driving force 108 causes a vibration providing a flexural oscillation 110 of optical fiber 102. Flexural driving force 108 is desirably provided at a resonance frequency of optical fiber 102 to maximize a vibration response of the fiber. In addition to flexural oscillation 110, an atomic force 112 provided by optical device 104 acts to change a loading condition on the end of the fiber according gap distance 106. The vibration condition may thus vary with the loading condition and may cause a shift in the resonance frequency. An optimal gap distance 106 may thus be determined by adjusting the gap distance in the z direction toward optical device 104 while monitoring flexural oscillation 110. An optimal gap distance may occur in a region beginning where the atomic force changes the loading condition to where there is contact between the end of optical fiber 102 and optical device 104. The inventors have determined that the atomic force may interact with the oscillation when the gap distance is between approximately 10-100 nm.

Figure 1B:
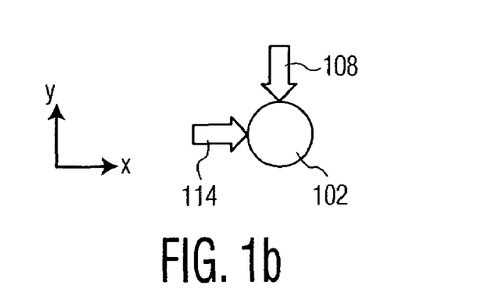
FIG. 1b is a cross-section of an optical fiber illustrating exemplary directions of flexural force according to an exemplary method of the present invention.

Flexural driving force 108 provided in the first direction according to the y-axis is used to determine an optimal gap distance 106 according to oscillation in the y-direction. In an alternative exemplary embodiment, a second flexural driving force 114 may be similarly provided in the x-direction, as illustrated in FIG. 1b. A cross-section of optical fiber 102 illustrates a desired relationship between first flexural driving force 108 and second flexural driving force 114, namely that the two forces, 108 and 114 are perpendicular to each other. It is understood that first flexural driving force 108 may be provided at any direction and is not limited to the y-direction as illustrated in FIGS. 1a and 1b and that the two flexural forces, when used need not be orthogonal.

Figure 2:
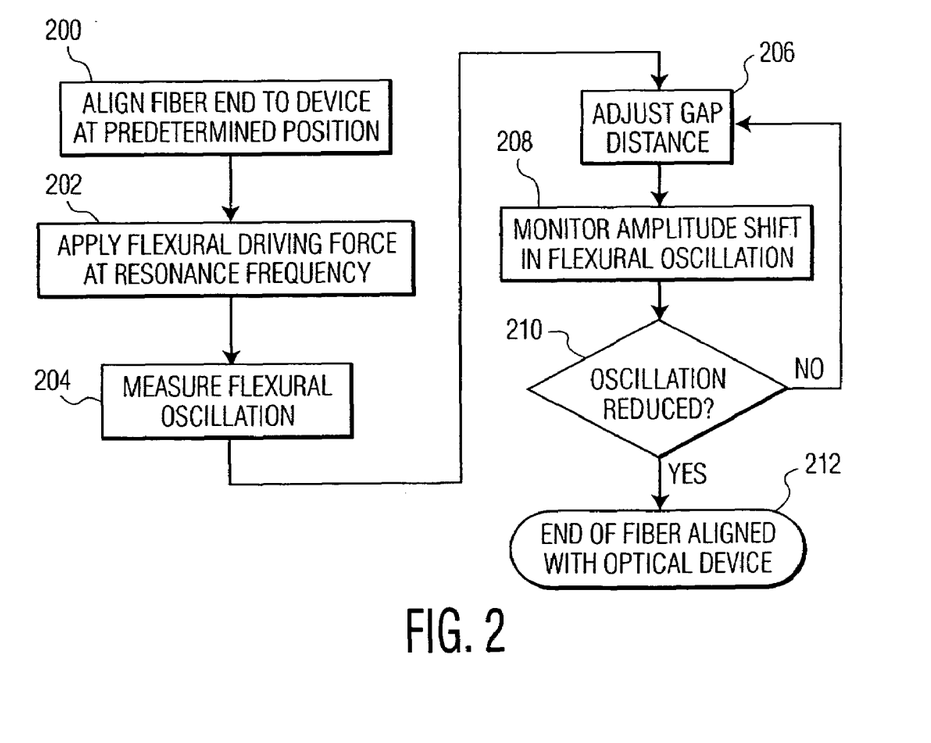
FIG. 2 is a flowchart illustrating an exemplary method of aligning the optical fiber to the optical device to optimize the gap distance according to the present invention.

Referring now to FIG. 2, an exemplary method of determining an optimal gap distance according to the present invention is described. In step 200, an end of the optical fiber is aligned according to a predetermined position. The predetermined position may be a predetermined z-position, x-position, y-position or any combination thereof to initially align the optical fiber with the optical device. The fiber may be precisely aligned in the x and y directions by measuring a coupling efficiency between the optical device and the fiber, for example using an optical power measure. The coupling efficiency measures the amount of energy coupled to or by the optical fiber. If the optical fiber is precisely aligned, a high portion of energy will be transferred to or from the fiber, resulting in a high coupling efficiency.

In step 202, a flexural driving force is applied to the optical fiber desirably at a resonance frequency of the optical fiber. The flexural driving force causes a flexural vibration providing an oscillation in the optical fiber. Because the driving force is applied at the resonance frequency only force to compensate for frictional losses is applied to maintain the oscillation at a substantially constant amplitude. In step 204, the flexural oscillation at the resonance frequency is measured by methods described below.

In step 206, the gap distance is decreased. Decreasing the gap distance may cause the atomic force to interfere with the oscillation by changing the loading condition, thus providing an amplitude shift. In step 208, an amplitude shift in the flexural oscillation is monitored. It is understood that steps 206 and 208 may be switched or combined into a single step. Step 210 checks whether the amplitude shift of the flexural oscillation has occurred and if it is reduced by at least a threshold amount. The threshold amount may be determined by experimentation. The amplitude shift may be a function of fiber type, optical device type and optical package. A range of values may be determined to account for the differences in fiber, device and package conditions. If the oscillation is reduced by the threshold amount, step 210 leads to step 212 and the process is complete.

If the oscillation is not reduced by the amount, step 210 leads to step 206. Steps 206 through 210 are repeated until the oscillation is reduced by the threshold amount. When the oscillation is reduced by the threshold amount, step 210 leads to step 212 and the process is complete.

It is contemplated that the exemplary method illustrated in FIG. 2 may be repeated for a number of positions of the optical fiber, for example, to improve a horizontal or lateral alignment of the optical fiber relative to an optical device.

For example, after the end of the fiber is aligned with the optical device, step 212, the fiber may be further aligned in a horizontal direction relative to the optical device. The end of the fiber may then be adjusted to the optimal gap distance previously determined from steps 200-212. The horizontal alignment, however, may cause the optimal gap distance to change. The gap distance may thus be readjusted using the exemplary method of steps 200-212.

Figure 3:
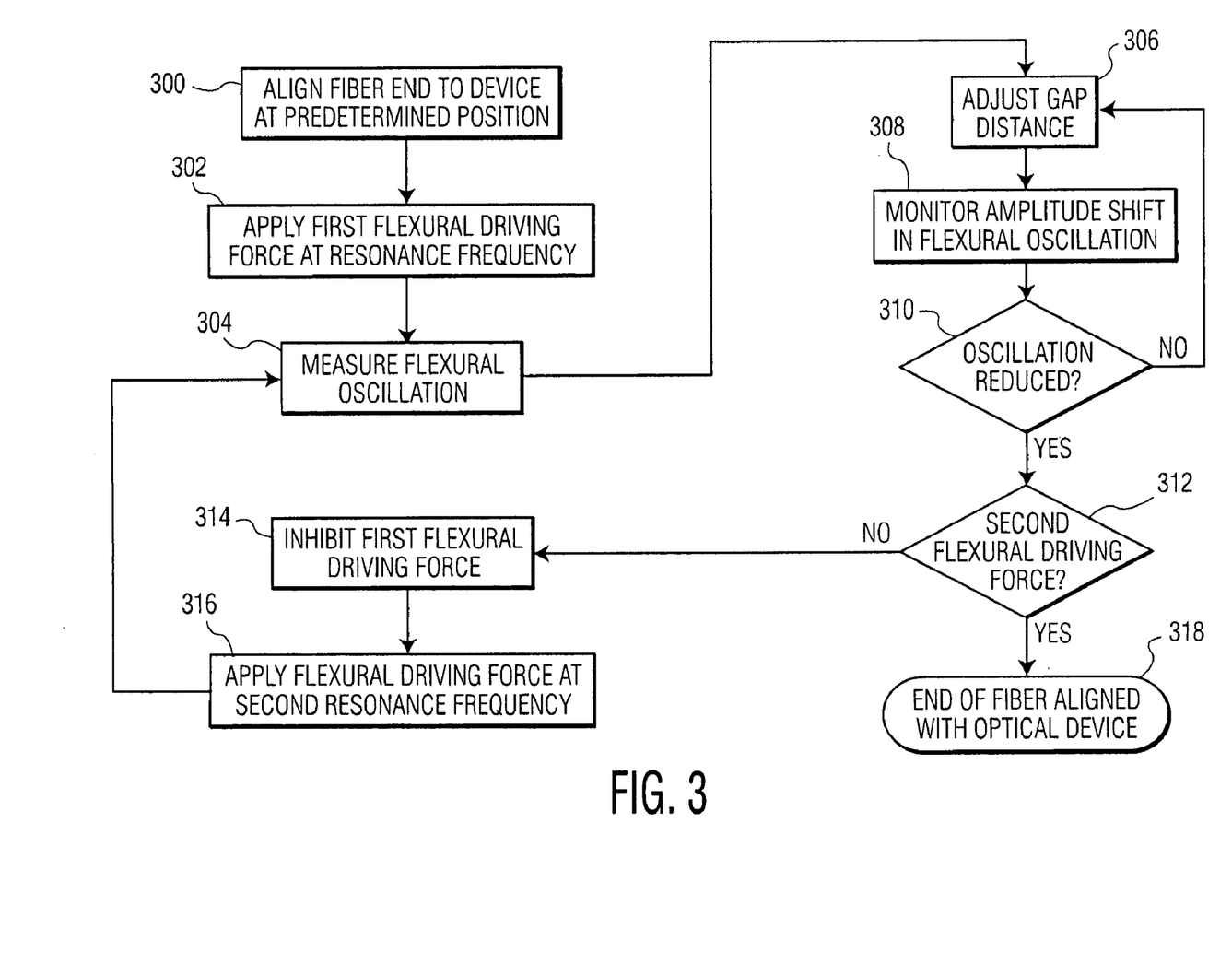
FIG. 3 is a flowchart illustrating an alternate exemplary method of aligning the optical fiber to the optical device using a first and second perpendicular flexural forces according to the present invention.

Referring now to FIG. 3, an alternate exemplary method of determining an optimal gap distance according to the present invention is described. In step 300, an end of the optical fiber is aligned according to a predetermined position as described above.

In step 302, a first flexural driving force is applied to the optical fiber desirably at a resonance frequency of the optical fiber. The first flexural driving force causes a flexural oscillation in the optical fiber in a first direction. In step 304, the flexural oscillation at the resonance frequency according to the first direction is measured.

In step 306, the gap distance is decreased. In step 308, an amplitude shift in the flexural oscillation is monitored. It is understood that steps 306 and 308 may be switched or combined into a single step. Step 310 checks whether the amplitude shift of the flexural oscillation has occurred and if it is reduced by the threshold amount as described above. If the oscillation is reduced by the threshold amount, step 310 leads to step 312.

If the oscillation is not reduced by the threshold amount, step 310 leads to step 306. Steps 306 through 310 are repeated until the oscillation is reduced by the threshold amount. After step 310 control passes to step 312.

Step 312 checks whether or not a second flexural driving force has been applied. If a second driving force has been applied, step 312 leads to step 318 and the process is complete.

If a second driving force has not been applied, step 312 leads to step 314. In step 314, the first driving force is inhibited. In step 316, a second driving force is applied in a second direction at a second resonance frequency of the fiber. The second resonance frequency may be equivalent to or different from the resonance frequency in the first direction. The atomic forces described above, a skew direction of the fiber, a skew direction of the applied force or a different application point for the second force may cause the second resonance frequency to be different from the resonant frequency of the first direction measurement. The second direction is related to the first direction as described above.

The second driving force causes a flexural oscillation in the second direction. The gap distance may be further optimized by using a force in the second direction. For example, the optical fiber may be skewed relative to the alignment with the optical device in at least one of the vertical and lateral directions such that a further optimization at the second direction may provide a more optimal alignment than measuring the gap distance in a single direction.

Step 316 leads to step 304. Steps 304 through 310 are repeated for the flexural oscillation in the second direction as described above until the oscillation in the second direction is reduced by a further threshold amount. The further threshold amount may be the same the same as the threshold amount described above or may be a smaller amount to account for the gap distance adjusted using the first driving force. After step 312 control passes to step 318, and the process is complete.

Figure 4:
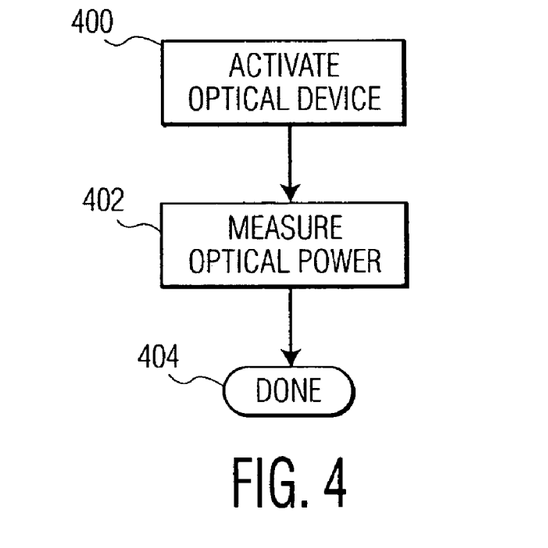
FIG. 4 is a flowchart illustrating a first exemplary method for measuring a flexural oscillation according to the present invention.

Referring now to FIG. 4, a first exemplary method of measuring a flexural oscillation, step 204 or step 304 according to the present invention is described. In step 400, the optical device is activated, sending light into the fiber according to an x and y direction alignment of the fiber end with the optical device. In step 402, an optical power of reflected light is measured, by using a photodiode, for example. Although not shown, it is contemplated that the optical power of light transmitted through the fiber may also be measured. The exemplary method causes the fiber to oscillate, and thus the optical power of the light transmitted through or reflected by the fiber will vary with the oscillation of the fiber. Step 402 leads to step 404 and the process is complete.

A second exemplary method of measuring a flexural oscillation, step 204 or step 304, measures a capacitance formed between a conductive coating on the optical fiber and an optical package which includes an electrode. The capacitance is a function of distance between the conductive coating and the electrode, and will thus vary with the oscillation of the fiber.

Figure 5:
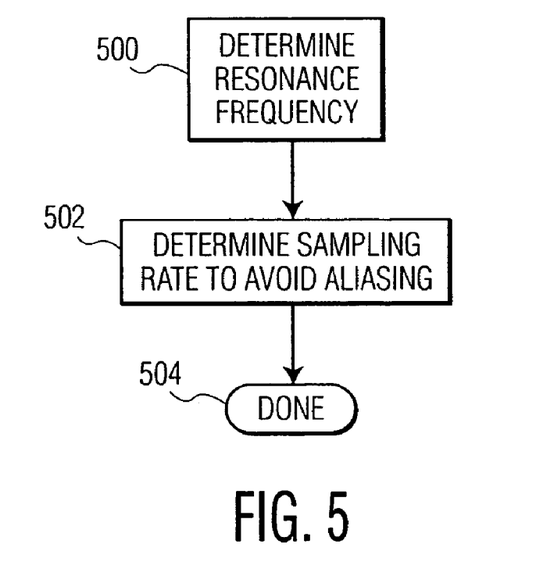
FIG. 5 is a flowchart illustrating a method for measuring a flexural oscillation at a non-aliasing sampling rate according to the present invention.

The oscillation measurement is desirably timed so that no aliasing occurs due to beats between the oscillatory frequency and the sampling frequency. Referring now to FIG. 5, a method to sample the flexural oscillation measurement to avoid aliasing is described. In step 500, a resonance frequency of the optical fiber is determined according to an exemplary embodiment of the present invention. In step 502, the sampling frequency for measuring the flexural oscillation is desirably chosen to be at least twice the highest desired frequency component. The highest frequency component desirably includes at least the resonance frequency determined in step 500 and may include a higher frequency component such that a shift in frequency amplitude changes when the gap distance decreases does not induce aliasing. Alternatively, an anti-aliasing filter (not shown) may be applied prior to sampling to remove frequency components above the desired frequency range that includes at least the resonance frequency determined in step 500. Step 502 leads to step 504 and the measurement sampling frequency selection is complete.

Figure 6A:
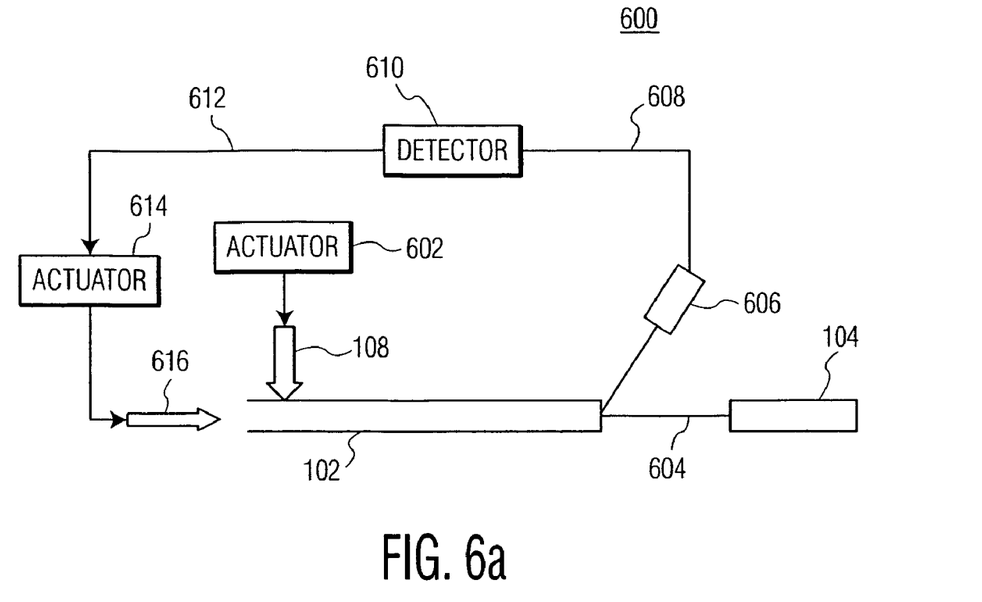
FIG. 6a is a side view illustrating a first exemplary optical fiber alignment system according to the present invention.

Referring now to FIG. 6a, a first exemplary optical alignment system 600 for measuring an optimal gap distance according to the present invention is described. Actuator 602 provides driving force 108 to optical fiber 102. Optical fiber 102 may be metallized or non-metallized. Optical fiber 102 may be at least one of wedge-lensed, ball, conical or flat-cleaved optical single mode or multi-mode fiber.

Optical device 104 provides an optical signal 604 to the end of optical fiber 102 that is oscillating at its resonance frequency. Photodetector 606 measures an optical power and provides measurement signal 608 to detector 610. Detector 610 monitors the amplitude shift in oscillation and provides output signal 612. Output signal 612 may be used to determine whether to adjust 616 the gap distance, using actuator 614.

Optical device 104 may be any surface that may receive an optical signal or from which an optical signal may radiate. For example, optical device 104 may be a photodiode, a semiconductor laser, an optical mirror, a second optical fiber, a semiconductor optical amplifier, an optical concentrator, and a light-emitting diode.

Actuator 602 desirably provides a flexural driving force 108 with a travel displacement of less than 500 μm. It is contemplated that actuator 602 may be at least one of a moving coil actuator, a piezoelectric actuator an ultrasonic actuator and a capacitance actuator.

Actuator 602 desirably provides a driving force 108 at a resonance frequency of fiber 102. Driving the fiber at the resonance frequency may provide a maximum oscillation measurement signal. The resonance frequency of the fiber may be determined by applying a signal with an adjustable frequency, such as a chirp signal to actuator 602. A frequency where a maximum oscillation is observed is desirably chosen as the fiber resonance frequency. Actuator 602 may subsequently be driven at this resonance frequency. The maximum oscillation may be observed from signal 608. It is understood that a maximum oscillation may be determined in the time domain, the frequency domain, or any combination thereof. Once the resonance frequency is determined, the resonance frequency may be monitored for an amplitude shift.

If a second driving force 114 is applied as described above, actuator 602 desirably applies second driving force 114 at about the same z-value and perpendicular to first driving force 108. A fiber resonance frequency for second driving force 114 may be different than for the first driving force as described above. It is desirable that a new resonance frequency be determined for second driving force 114.

Actuator 614 may be used to adjust 616 the gap distance between optical fiber 102 and optical device 104. Actuator 614 is desirably a linear actuator with a travel range of about 100 μm. A linear actuator may be a precision motion system such as, for example, a piezo actuator, a combination of an ultrasonic motor, a high precision feedback encoder, and a high precision linear bearing or a motion system using a friction drive.

Figure 6B:
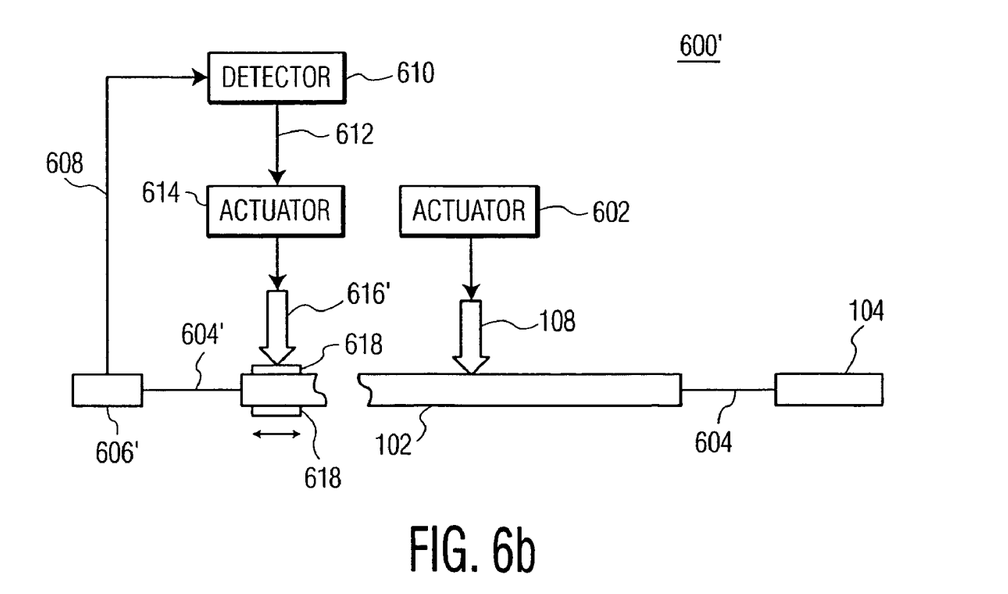
FIG. 6b is a side view illustrating an alternate exemplary optical fiber alignment system according to the present invention.

FIG. 6b shows an alternate exemplary optical alignment system 600' for measuring an optimal gap distance according to the present invention. Actuator 602 provides driving force 108 to optical fiber 102. Optical device 104 provides an optical signal 604 to the end of optical fiber 102 that is oscillating at its resonance frequency. Photodetector 606' measures an optical power and provides measurement signal 608 to detector 610. Photodetector 606' may be the same as photodetector 606 except that photodetector 606' measures an optical power of light 604' transmitted through the fiber 102.

Detector 610 monitors the amplitude shift in oscillation and provides output signal 612. Output signal 612 may be used to determine whether to adjust 616' the gap distance, using actuator 614 coupled to clamp 618. Clamp 618 may be attached to optical fiber 102 such that the action of actuator 614 may adjust 616' the gap distance in the direction indicated by the arrow.

Figure 7A:
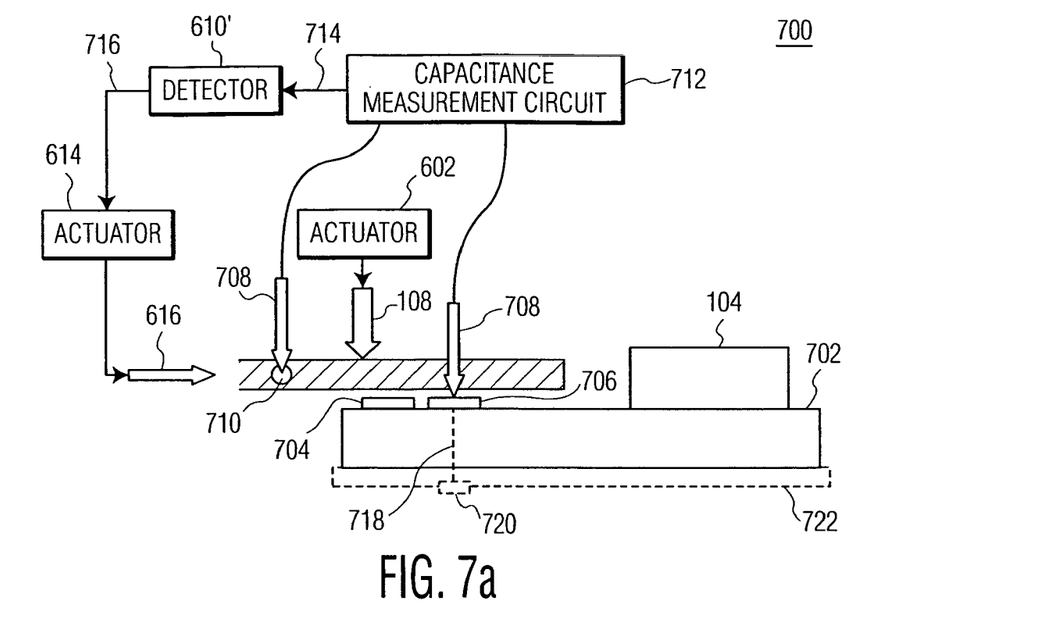
FIG. 7a is a side view illustrating a second exemplary optical fiber alignment system according to the present invention.
Figure 7B:
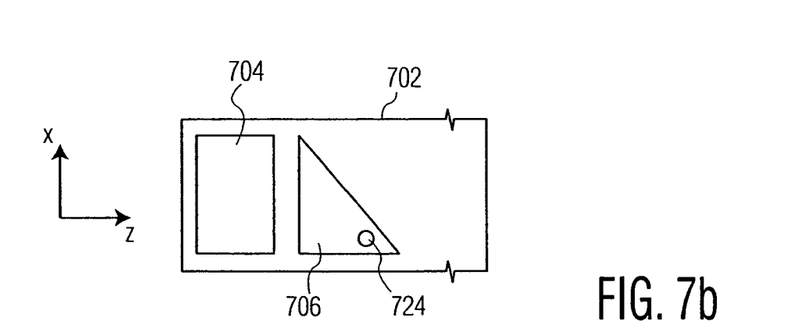
FIG. 7b is an overhead view of a fiber mount platform illustrating an arrangement of a fiber mount area and an electrode shape according to the second exemplary optical fiber alignment system of the present invention.
Figure 7C:
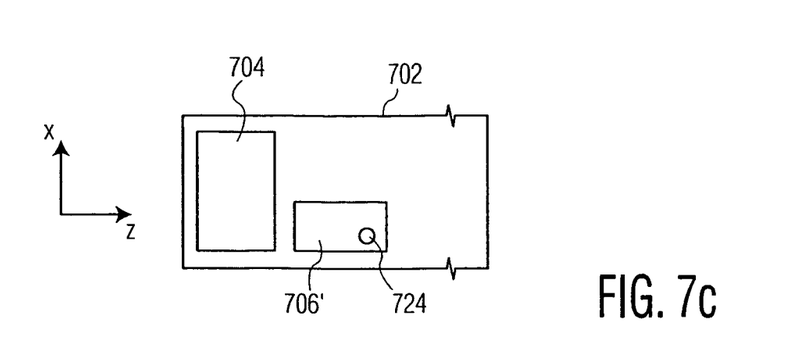
FIG. 7c is an overhead view of a fiber mount platform illustrating an arrangement of a fiber mount area and an alternate electrode shape according to the second exemplary optical fiber alignment system of the present invention.

Referring now to FIGS. 7a-c, a second exemplary optical alignment system 700 for measuring an optimal gap distance according to the present invention is described. Optical device 104 may be provided on substrate 702 that may include a fiber mount area 704 and an electrode 706. Actuator 602 provides a flexural driving force 108 to fiber 102'.

Other components described in first exemplary system 600 are similar for second exemplary system 700.

Optical fiber 102' desirably includes a conductive material on at least a portion of the fiber 102' proximate to electrode 706. Although the conductive material is illustrated as extending to the tip of the fiber, only a segment of the fiber may include conductive material provided the segment is proximate to electrode 706. Optical fiber 102' may be at least a wedge-lensed, ball, conical or flat-cleaved optical single mode or multimode fiber. Conductive material may include at least a metallization, a conductive plastic, or a conductive composite.

Electrode 706 may be coupled to capacitance measurement circuit 712 with electrical probe 708. A contact 710 on fiber 102' may be coupled to capacitance measurement circuit 712 using a second electrical probe 708. A measurement signal 714 may be provided to detector 610'. Detector 610' desirably provides output signal 716 to monitor an amplitude shift in the oscillation of fiber 102'. Output signal 716 may be used to determine whether or not to adjust 616 the gap distance, using actuator 614.

In this embodiment of the invention, it may be desirable to couple the capacitance measurement circuit to the conductively coated optical fiber at a location that does not interfere with the oscillation of the fiber, for example at a position to the left of actuator 602 as shown in FIG. 7a.

It is contemplated that the conductively coated optical fiber may be coupled to a structure having electrode properties. For example, the fiber may be attached to an electrically conductive fiber gripper which makes electrical contact with the conductively coated fiber. The capacitance measurement circuit may thus be coupled to the structure having electrode properties rather than directly to the optical fiber.

Electrode 706 and the conductive coating provides a capacitance measure corresponding to fiber oscillation and atomic force interaction when the optical fiber oscillates in the y-direction. A capacitance measure of x-direction oscillation may further be provided by the same electrode 706 and conductive coating if actuator 602 applies second driving force 114.

An optical package may alternatively include a feedthrough connection 718 within substrate 702 to connect electrode 706 to contact 720 on an optical package base 722. The optical package may thus be directly connected through contact 720 to capacitance measurement circuit 712.

As shown in FIGS. 7b and 7c two alternate electrode patterns are illustrated for measuring x and y-direction oscillation. In FIG. 7b, electrode 706 is triangular shaped. In FIG. 7c, electrode 706' is rectangular shaped and does not extend across the x-direction of the top surface of substrate 702. Electrode 706 is desirably provided on the top surface of substrate 702. Electrodes 706 and 706' may be provided with contacts 724 for allowing contact with capacitance measurement circuit 712.

Detector 610, 610' may be amplitude detectors. The amplitude of measurement signals 608, 714 may be monitored for a change in the amplitude or the phase if an oscillatory driving force 108 is used. Alternatively, driving force 108 may be an impulse. A change in an impulse response may be monitored, such as a decay rate of the impulse response, to determine an optimal gap distance.

Amplitude detection of the measurement signal may have less accuracy as compared with frequency detection due to, for example, laser power fluctuation or amplification drift in the capacitance measurement circuit. Frequency detection may not be subject to a significant amount of amplitude fluctuation. Exemplary detector 610 (610') uses a phase-locked loop (PLL) circuit for frequency detection caused by a resonance frequency shift and may thus provide an improved accuracy over amplitude detection.

Figure 8A:
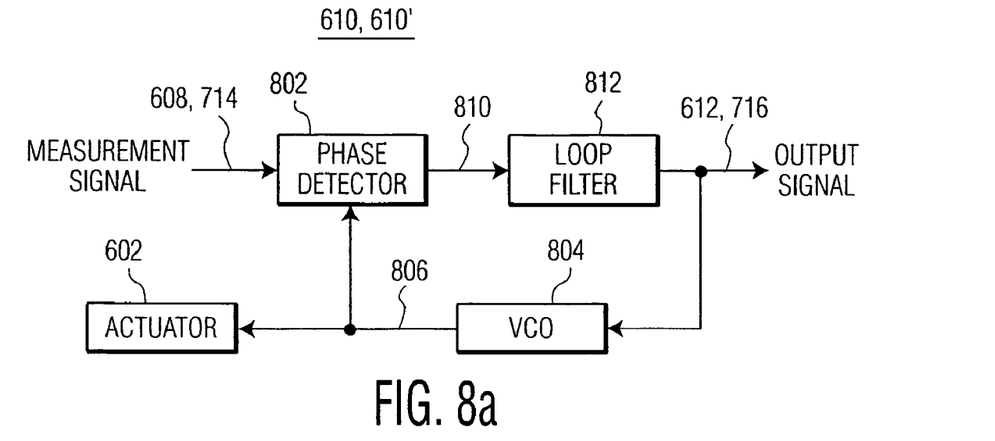
FIG. 8a is a system diagram illustrating an exemplary detector for detecting a shift in amplitude of the flexural oscillation according to the present invention.

Referring now to FIG. 8a, exemplary detectors 610 and 610' are described. Detectors 610 and 610' are desirably PLL circuits. Detector 610 is the same as detector 610' except that detector 610 receives the photodiode signal 608 while detector 610' receives capacitance measurement signal 714. PLL circuit 610 (610') includes phase detector 802 for receiving measurement signal 608 (714) and an oscillatory signal 806 from voltage controlled oscillator (VCO) 804. VCO 804 provides an oscillatory signal 806 responsive to a control signal. Oscillatory signal 806 may also be provided to actuator 602.

Phase detector 802 measures a phase difference between measurement signal 608 (714) and oscillatory signal 806 and provides a phase difference signal 810 to loop filter 812. Loop filter 812 filters phase difference signal 810 to provide output signal 612 (716) which is a frequency difference signal. Loop filter 812 also provides a control signal to VCO 804.

In an exemplary embodiment, loop filter 812 is a first-order infinite-impulse response (IIR) filter which integrates the phase difference signal 810 provided by the phase detector 802 to develop a frequency difference signal 612 (716) that is applied to the VCO 804 to adjust its frequency in a sense that tends to minimize the phase difference between the output signal 806 of the VCO 804 and the measurement signal 608 (714). It is understood that loop filter 812 may be any stable filter. The oscillatory signal applied to actuator 602 causes the optical fiber to resonate at its resonance frequency. A frequency shift may be thus detected from frequency difference signal 612 (716).

The inventors have determined that exemplary optical alignment systems 600 and 700 each provide a resolution in the nanometer range to monitor the gap distance while observing changes in the amplitude shift. The present invention thus allows a precise determination of gap distance as well as optical device position, such as a laser facet position and may provide a reliable fiber alignment procedure.

Figure 8B:
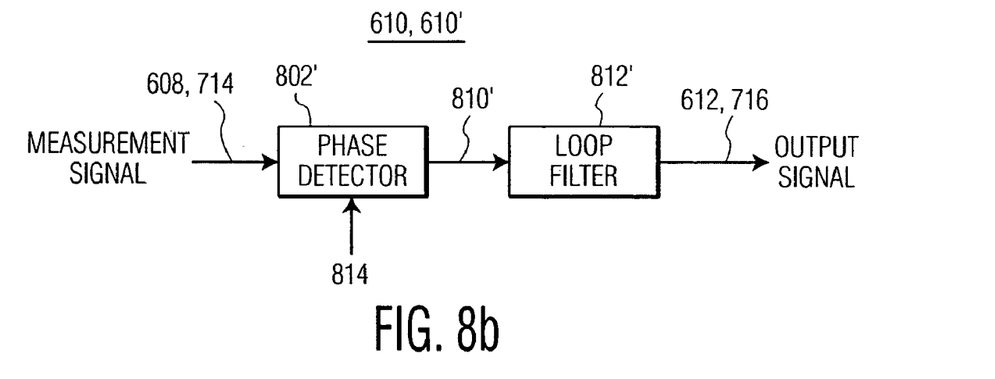
FIG. 8b is a system diagram illustrating an alternate exemplary detector for detecting a shift in amplitude of the flexural oscillation according to the present invention.

Referring now to FIG. 8b, an alternate embodiment of exemplary detectors 610 and 610' is described. Phase detector 802' receives photodiode signal 608 (detector 610) or capacitance measurement signal 714 (detector 610'). Phase detector 802' further receives reference frequency signal 814. Phase detector 802' provides a phase difference signal 810' to loop filter 812'. Loop filter 812' filters the phase difference signal 810' to provide output signal 612 (716) which is a phase shift signal.

Phase detector 802' is the same as phase detector 802 except that phase detector 802' detects a phase shift of the measurement signal 608 (714) with respect to reference frequency signal 814. Reference frequency signal 814 may be provided at a fixed frequency that is the resonance frequency of the optical fiber before the atomic force interferes with the fiber oscillation. A phase shift may be detected when the atomic force begins to interfere with the oscillation of the fiber.

Phase difference signal 810' is the same as phase difference signal 810 except that phase difference signal 810' detects a phase difference between measurement signal 608(714) and reference frequency signal 814. It is contemplated that loop filter 812' may be any low pass filter that removes oscillatory components at or near the reference frequency.

The invention is illustrated by reference to an illustrative example. The example is included to more clearly demonstrate the overall nature of the invention. The example is illustrative, not restrictive of the invention.

EXAMPLE

Figure 9:
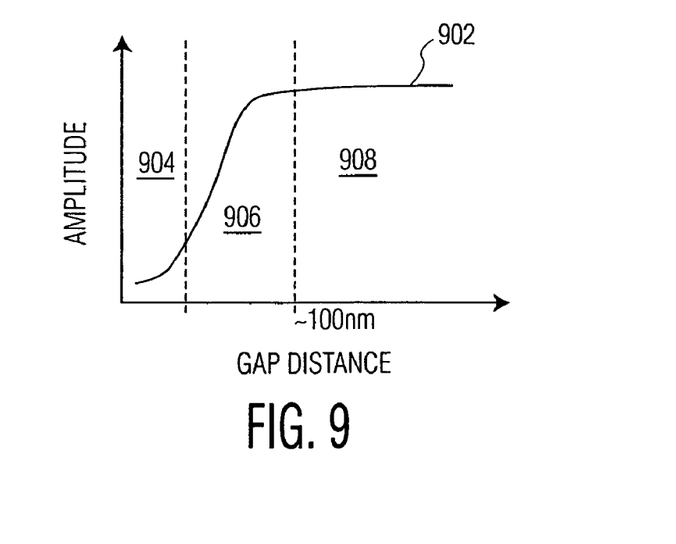
FIG. 9 is a graph of a gap distance versus oscillation amplitude which is useful for describing the present invention.

Referring now to FIG. 9, an illustrative example of an amplitude shift according to gap distance according to an exemplary embodiment of the present invention is now described. Amplitude shift 902 is illustrated as a gap distance increases between an optical fiber end and an optical device. In region 908, the gap distance is large and the atomic force does not act on the oscillatory motion. In region 906, an atomic force interacts with the oscillatory motion, thus changing the loading conditions and causing an amplitude shift. In region 904, the fiber is approaching or in contact with the optical device, thus providing a minimal motion.

It is desirable to adjust the gap distance such that the amplitude shift is provided as in region 906. Region 906 allows the fiber to be placed within about 10 to 100 nm of the optical device. Operation in region 904 may cause damage to the optical fiber if the optical fiber is directly in contact with the optical device and still in oscillation. In region 908, the gap distance is not optimized. Although FIG. 9 illustrates that the atomic force begins to act on the oscillatory motion within about 100 nm, this is only an illustrative number. An atomic force interaction distance may depend on the fiber conditions, for example, the fiber edge geometry and fiber size.

Although the invention is illustrated and described herein with reference to specific embodiments, the invention is not intended to be limited to the details shown. Rather, various modifications may be made in the details within the scope and range of equivalents of the claims and without departing from the invention.

What is claimed is:

1. An optical fiber alignment system for aligning an end of an optical fiber with an optical device to achieve a predetermined gap distance between the optical fiber and the optical device, the optical fiber alignment system comprising:

a first actuator which applies a force having a component that is normal to a central axis along a length of the optical fiber, the force providing a flexural vibration of the optical fiber to cause an oscillation of the optical fiber, wherein the force is provided at a resonance frequency of the optical fiber;

a sensing apparatus which senses the oscillation of the optical fiber;

a detector which determines a shift in an amplitude of the oscillation sensed by the sensing apparatus; and a second actuator which adjusts the gap distance between the optical fiber and the optical device according to the shift in the amplitude of the oscillation determined by the detector, whereby an atomic force between the end of the optical fiber and the optical device varies according to the gap distance provided by the second actuator, the variation in the atomic force resulting in the shift in the amplitude of the oscillation.

2. An optical alignment system according to claim 1, wherein the first actuator is one of a moving coil actuator, a piezoelectric actuator, an ultrasonic actuator and a capacitance actuator.

3. An optical alignment system according to claim 1, wherein the second actuator is a linear motion actuator.

4. An optical alignment system according to claim 1, wherein the detector includes a phase shift detector.

5. An optical fiber alignment system according to claim 1, wherein the detector includes a phase-locked loop (PLL) circuit, the PLL circuit comprising:

an input terminal which receives a signal provided by the sensing apparatus;

a voltage controlled oscillator (VCO) which provides an oscillatory output signal responsive to a control signal;

a phase detector coupled to the input terminal and the VCO which measures a phase difference between the signal provided by the sensing apparatus and the signal provided by the VCO, the phase detector providing a phase difference signal;

a loop filter coupled to the phase detector which filters the phase difference signal to provide the control signal for the VCO, the loop filter further coupled to the VCO; and an output terminal coupled to the loop filter which provides a signal representing the shift in amplitude of the oscillation, wherein the change in the control signal is a function of the shift in the amplitude of the oscillation.

6. An optical alignment system according to claim 5, wherein the loop filter comprises a first order infinite impulse response (IIR) filter.

7. An optical fiber alignment system according to claim 1, wherein the optical device is a light emitting device and the sensing apparatus comprises:

a photodetector which measures an output received from the optical device through the optical fiber,
wherein the photodetector measures an optical power between the optical fiber and the optical device.

8. An optical fiber alignment system according to claim 1, the sensing apparatus comprising:
   a base having an electrode disposed adjacent to the base and the optical fiber provided above the base;
   a conductive coating provided on the optical fiber between the first actuator and the end of the optical fiber; and
   a capacitance measurement circuit which measures a capacitance formed between the conductive coating and the electrode.

9. An optical fiber alignment system according to claim 8, the sensing apparatus further comprising:
   first and second electrical probes coupled at a first end to the conductive coating and the electrode, respectively, and coupled at a second end to the capacitance measurement circuit.

10. An optical fiber alignment system according to claim 8, wherein the base includes a contact making contact with the capacitance measurement circuit.

11. Apparatus for aligning an end of an optical fiber to an optical device to achieve a predetermined gap distance between the end of the optical fiber and the optical device, the apparatus comprising:
   means for aligning the end of the optical fiber to be substantially at a predetermined position relative to the optical device;
   means for applying a first driving force normal to a central axis along a length of the optical fiber to produce a flexural oscillation of the optical fiber at the resonance frequency of the optical fiber;
   means for measuring the flexural oscillation of the optical fiber;
   means for monitoring a shift in amplitude of the flexural oscillation; and
   means for adjusting the gap distance between the optical fiber and the optical device, whereby the gap distance changes an atomic force between the optical fiber and the optical device, and the atomic force provides a shift in the amplitude of the flexural oscillation.

12. Apparatus according to claim 11, the apparatus further comprising:
   means for inhibiting the first driving force; and
   means for applying a second driving force at a second resonance frequency normal to the central axis, the second driving force being a force component that is substantially perpendicular to the first driving force and to the central axis of the optical fiber.

13. Apparatus according to claim 11, wherein the means for measuring the flexural oscillation comprises:
   a conductive coating on the optical fiber;
   an electrode adjacent to a base, the base disposed under the optical fiber; and
   a capacitance measuring circuit for measuring a capacitance developed between the conductive coating and the electrode.

14. Apparatus according to claim 11, wherein the optical device is a light emitting device and the means for measuring the flexural oscillation comprises:
   means for activating the optical device; and
   means for measuring an optical power provided from the optical device into the end of the of the optical fiber.

15. A method of aligning an end of an optical fiber to an optical device to achieve a predetermined gap distance between the end of the optical fiber and the optical device, the method comprising:
   a) aligning the end of the optical fiber to be substantially at a predetermined position relative to the optical device;
   b) applying a first driving force normal to a central axis along a length of the optical fiber to provide a flexural oscillation of the optical fiber at the resonance frequency of the optical fiber;
   c) measuring the flexural oscillation of the optical fiber;
   d) monitoring a shift in amplitude of the flexural oscillation;
   e) adjusting the gap distance between the optical fiber and the optical device, the gap distance to change an atomic force between the optical fiber and the optical device, the atomic force providing a shift in the amplitude of the flexural oscillation; and
   f) repeating steps (d) and (e) until the amplitude of the flexural oscillation is reduced to by at least a threshold amount.

16. The method according to claim 15, the method further comprising the steps:
   g) inhibiting the first driving force;
   h) applying a second driving force at a second resonance frequency normal to the central axis and having a component that is perpendicular to the first driving force and perpendicular to the central axis of the optical fiber; and
   i) repeating steps (c) through (f) until the amplitude of the flexural oscillation is reduced by at least a further threshold amount.

17. The method according to claim 15, wherein a conductive coating is provided to the optical fiber and an electrode is provided adjacent to a base disposed under the optical fiber, the step of measuring the flexural oscillation comprises:
   measuring a capacitance developed between the electrode and the conductive coating.

18. The method according to claim 15, the step of measuring the flexural oscillation comprising the steps:
   (c1) activating the optical device; and
   (c2) measuring an optical power from the optical device into the end of the optical fiber.

* * * * *